R. P. WILLIAMS.
SPRAY NOZZLE.
APPLICATION FILED MAY 19, 1915. RENEWED APR. 15, 1916.
1,185,565.
Patented May 30, 1916.
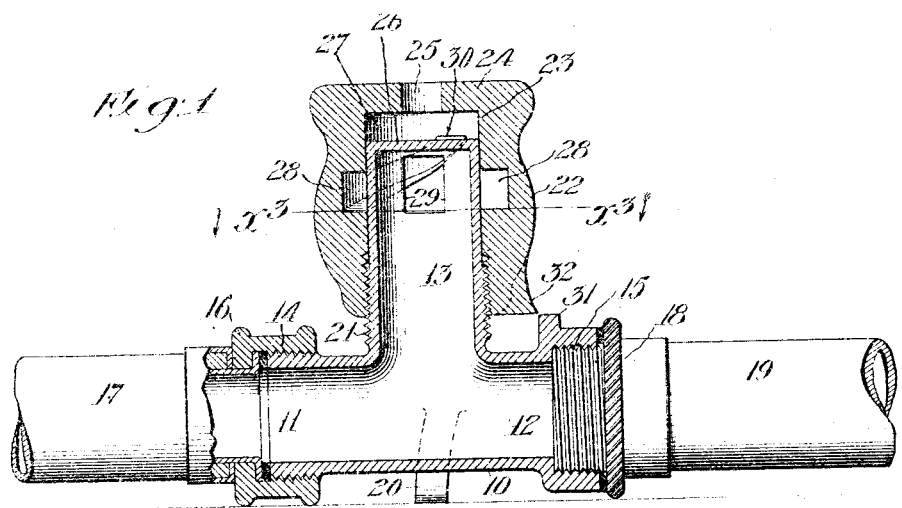
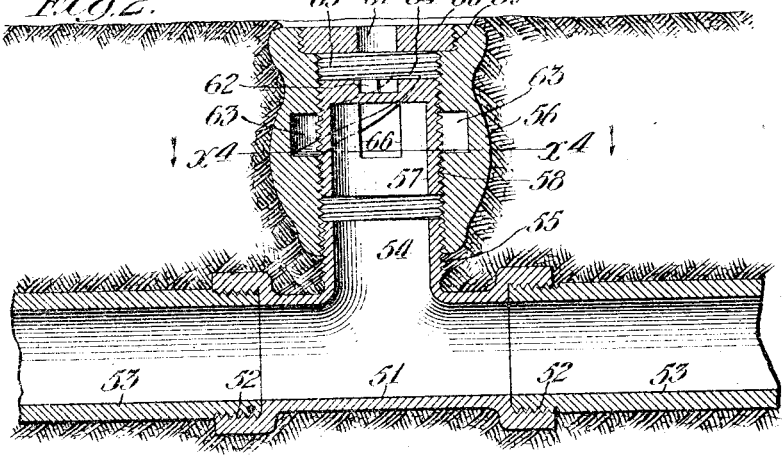
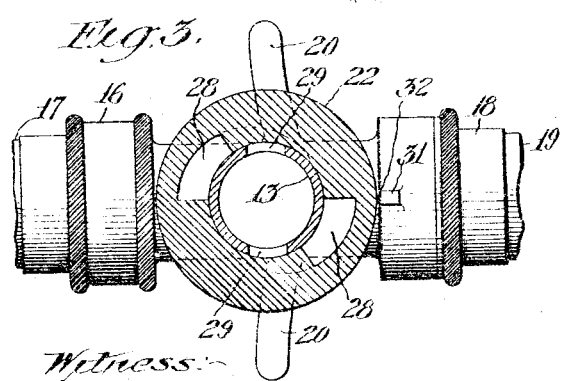
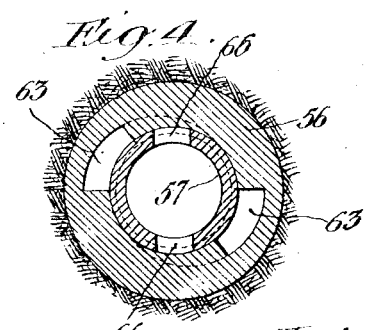
Witness:
Louis W. Gratz
Inventor
Roy P. Williams
by Townsend, Graham & Harris
his Atty's

UNITED STATES PATENT OFFICE.

ROY P. WILLIAMS, OF PASADENA, CALIFORNIA, ASSIGNOR TO A. M. DRAKE, OF PASADENA, CALIFORNIA.

SPRAY-NOZZLE.

1,185,565.      Specification of Letters Patent.      Patented May 30, 1916.

Application filed May 19, 1915, Serial No. 29,214. Renewed April 15, 1916. Serial No. 91,484.

*To all whom it may concern:*

Be it known that I, ROY P. WILLIAMS, a citizen of the United States, residing at Pasadena, in the county of Los Angeles, State of California, have invented a new and useful Spray-Nozzle, of which the following is a specification.

My invention relates to spray nozzles.

The principal object of the invention is to provide a spray nozzle in which the fineness of the spray may be regulated and in which the amount of water passing through the spray nozzle may be regulated independent of the previously mentioned regulation of the spray.

A further object of the invention is to provide spray nozzles, several of which may be connected in series, using lengths of ordinary garden hose with the standard forms of couplings thereon.

A still further object of the invention is to provide a spray nozzle which may be embedded in the ground and in which both the amount of water passing through the spray nozzle and the fineness of the spray may be regulated through an opening in the top of the nozzle.

A further object of the invention is to provide an external means for indicating the position of the internal parts.

Referring to the drawings which are for illustrative purposes only: Figure 1 is a sectional elevation of my invention as adapted for use in a line of flexible garden hose so that it may be transported from place to place. Fig. 2 is a sectional elevation of my invention as applied to the water systems in which the spray nozzle is partially buried in the ground, the spray nozzle being permanently located for this purpose. Fig. 3 is a section on the plane $x^3$—$x^3$ of Fig. 1 looking in the direction of the arrows. Fig. 4 is a section on the plane $x^4$—$x^4$ of Fig. 2 looking in the direction of the arrows.

In the form of the invention illustrated in Fig. 1, 10 is a T-shaped body member having horizontal branches 11 and 12 and a vertical branch 13. The horizontal branch 11 is exteriorly threaded, as shown at 14, and the horizontal branch 12 is interiorly threaded as shown at 15. The coupling 16 of a section of hose 17 may be secured on the thread 14 and a coupling 18 of a similar hose member 19 may be secured in the threads 15, the coupling 16 being interiorly threaded and the coupling 18 being exteriorly threaded so that they may be joined together or joined to other hose sections if desired. Legs 40 are cast on the side of the member 10 extending sidewardly therefrom so that the body 10 tends to rest on the ground with the branch 13 substantially vertical. The branch 13 is provided with an external thread 21 on which a cap 22 is threaded, this cap having a central bore 23 and a top 24 in which an outlet opening 25 is formed. The upper end of the branch 13 is closed by a wall 26, a cavity 27 being normally formed inside the bore 23 between the end 24 and the wall 26. Cut in the inside of the bore 23 are helical passages 28, these passages tapering gradually from their lower to their upper end so that the upper end is shallow and narrow and the lower end is comparatively deep and wide. Ports 29 are cut in the side walls of the branch 13 in such a position that they open into the grooves 28 when the cap 22 is turned into a certain position, the configuration of the grooves being such that the opening thereto through the port 29 is gradually shut off as the cap 22 is rotated. The grooves 28 are of sufficient length to extend slightly above the top 26 with the parts in the position shown in Fig. 1, a small outlet opening 30 being thereby left above the top 26. For the purpose of enabling the operator to tell the exact position of the ports a mark 31 is cast on the body 10 and a pointer 32 is cast on the cap 22 in such a position that the water is turned on full force when the pointer 32 coincides with the mark 31.

The method of operation of the invention is as follows: Water being supplied through either of the hose members 17 or 19, water pressure is produced in the interior of the branch 13 and flows through the ports 29 into the grooves 28 when the cap is in the proper position to allow this. Water is forced upwardly through the grooves 28, being given a spiral motion therein, emerging through the opening 20 into the cavity 27 where it is swirled around, due to its being directed more or less tangentially, finally emerging in a fine spray through the opening 25. If it is desired to shut off or partially shut off the flow of water the cap 22 is rotated so that the effective area of the port 29 into the groove 28 is reduced. It is thus possible by a partial revolution of the cap 22 to wholly shut off the flow of water into the groove 28 and consequently the flow of spray through the opening 25. When it is desired to change the character of the spray the cap 22 may be given a complete revolution or several revolutions if desired so that the area of the opening 30 will be largely increased. It is thus possible to regulate the opening 30 or to regulate the effective area of the port 29 where it opens into the groove 28.

In the form of the invention illustrated in Fig. 2 a T-shaped body member 51 has horizontal branches provided with internal threads 52 into which pipe members 53 are threaded. A vertical branch 54 of the body member 51 has an external thread 55 formed thereon and a cap 56 is rigidly and permanently secured on the thread 55. Threaded inside the cap 56 is a thimble 57, this thimble having an external thread 58 by which it may be adjusted up or down in the cap 56. The cap 56 is threaded at 59 and a plug 60 is threaded therein, this plug having a central opening 61 through which the spray finally emerges. A square recess 62 or a screw driver slot is provided in the top of the thimble 57 in line with the opening 61 so that the thimble can be adjusted up or down in the cap 56 without the necessity for removing the cap 56 from the body member 51 or removing the plug 60 from the body member 51. Spiral grooves 63 are cut in the inner surface of the body member 56, these grooves tapering upwardly and having their greatest area at the lower end. They are of such length that they communicate with a cavity 65 above the thimble 57 and below the plug 60 in the wall of the thimble, these ports serving to allow water to pass therethrough from the interior of the body member 51 to the groove 63.

The method of operation of the invention is as follows: The pipes 53, the body member 51 and the connecting parts are assembled in place in the ground approximately as shown in the drawings. Whenever it is desired to regulate the total quantity of water passing from the port 66 into the groove 63 this can be done by a partial turn of the thimble 57, this partial revolution turning the member 56 in such a position as to wholly or partially shut off the flow of water to the groove 63. When it is desired to materially change the fineness of the spray it can be done by a similar movement of the thimble 57, it being possible to turn the thimble 57 through several revolutions, thereby greatly increasing the size of the opening 64.

I claim as my invention:

1. In a spray nozzle, a hollow cylinder having one end closed and having ports in the side walls, means for supplying fluid to the interior of said cylinder, and a cap threaded on the exterior of said cylinder, said cap having a central opening through which the fluid is passed, and helical grooves so placed that they coact with said ports to regulate the amount of water passing through said central opening.

2. In a spray nozzle, a hollow cylinder having one end closed and having ports in the side walls, means for supplying fluid to the interior of said cylinder, and a cap threaded on the exterior of said cylinder, said cap having a central opening through which the fluid is passed and helical grooves so placed that they coact with said ports to regulate the amount of water passing through said central opening, said helical grooves being tapered to a thin point at their upper end which is so placed that communication from the grooves to the space above the cylinder may be wholly or partially shut off by adjusting the cap axially on the cylinder.

In testimony whereof, I have hereunto set my hand at Los Angeles, California, this 13th day of May, 1915.

ROY P. WILLIAMS